Patented Nov. 11, 1941

2,262,072

UNITED STATES PATENT OFFICE 2,262,072

METALLIZING OPERATION

Thomas H. Vaughn, Niagara Falls, N. Y., assignor to Union Carbide and Carbon Research Laboratories, Inc., a corporation of New York No Drawing. Application January 10, 1939, Serial No. 250,139

12 Claims. (Cl. 91—70.2)

The invention relates to metallizing processes in which metal is melted, atomized and sprayed onto the surface of an article, for example, by means of a spray "gun"; and it is an object of the invention to provide a process of obtaining an improved bond between the metal particles of which the sprayed coating is composed, and between the metallic coating as a whole and the article to which it is applied. It is a further object of the invention to decrease the discoloration or loss of metallic lustre of the metallic coating caused by the conditions under which the metallic spray or atomized metal is produced and projected onto the article being coated therewith.

The difficulties indicated above have been traced to the presence of a thin film of metallic oxides formed on the surface of the metal particles during the spraying operation. The present invention is based upon my discovery that the formation of this oxidic film can be nearly or quite prevented by the use, in the spraying operation, of volatile fluxes, and especially those of the type described in the pending United States patent application Serial No. 250,140, filed January 10, 1939, by A. R. Lytle and T. H. Vaughn, for an invention entitled "Volatile welding fluxes." These volatile or volatilizable fluxes comprise low- or medium-boiling liquids, the essential ingredients of which are the alkyl esters of boric acids, the alkyl esters of silicic acids, and mixtures of these esters, which can be introduced readily and continuously in uniform amounts into the gas or gases used in the metallizing operation in sufficient proportion to bring about the desired result. I attribute the beneficial action of such welding fluxes to their strongly reducing chemical action which inhibits oxidation of the metal particles, and to the dissolving action of the boric oxide and/or silicon dioxide produced by the combustion of the volatile flux, upon such small amounts of metal oxides as may be formed during the metallizing operation.

Among volatile fluxes especially suitable for use in the process are distilled methyl, ethyl and isopropyl borates; methyl and ethyl silicates; mixtures of such borates and/or silicates; and solutions of crude or distilled volatile borates or silicates in volatile organic solvents. Particularly advantageous are mixtures of the volatile alkyl borates with organic solvents which form azeotropic mixtures with the said borates. When using such mixtures, it is preferred to employ the components in at least approximately the ratio in which they occur in their azeotropic composition. This may be accomplished by contacting the gas to be impregnated and an approximately azeotropic mixture of the alkyl borate and volatile solvent. Among suitable solvents, yielding azeotropes with the lower alkyl borates, may be mentioned alcohols, such as methanol and ethanol; ketones, such as acetone and methyl isobutyl ketone; and certain chlorinated solvents, such as perchlorethylene. As examples of azeotropic mixtures containing volatile fluxes and adapted for use in the process may be mentioned a mixture of trimethyl borate and methanol, containing 73% by weight of the former; a mixture of triethyl borate and ethanol, containing 25% by weight of the former; a mixture of triisopropyl borate and methanol, containing 32% by weight of the former; and a mixture of trimethyl borate and acetone, containing 35% by weight of the former. Mixtures containing the alkyl borate in amount substantially in excess of that present in the azeotropic composition are preferable for certain services. The presence of small amounts of moisture, or of volatile impurities such as the usual denaturants for ethyl alcohol, apparently is not objectionable.

In cases where the heat required for the metallizing operation is developed by a gas flame, such as an oxyacetylene flame, I find it convenient to apply the volatile flux by impregnating the heating gas with it, in the manner described in the above-mentioned patent application Serial No. 250,140. In other cases, as, for example, where the heat for melting the metal is developed by an electric arc, and the metal spray is produced by a jet of inert gas such as nitrogen, or by a reducing gas such as hydrogen or methane, I find it convenient to impregnate the inert gas or the reducing gas with the volatile flux in similar manner.

Preferably the gas stream employed for atomizing the molten metal and for projecting the metallic spray upon the article to be coated therewith is impregnated continuously and uniformly, with a selected amount of the volatile flux in suitable manner, such as that described in the above-mentioned copending application. Thus, all or a selected portion of the gas stream so employed may be passed, under a fixed uniform pressure, over the exposed surface of a body of the liquid flux maintained at a suitable temperature—or the gas may be bubbled through a body of the liquid flux of fixed depth. The gas may be dehydrated prior to contact with the flux.

The method of the invention has been employed for such diverse operations as coating the surface of a bonded alundum mold with bronze—and coating sand-blasted steel articles with bronze for the production of removable coatings, useful in the reproduction of medals, etc. Comparative tests made with and without flux showed that, in the case of mold coatings, strongly coherent "casts" or shells having extremely sharp margins and fine details were produced when the volatile flux was used. In the case of coated articles, the lustre of the coating, and its adherence when subjected to severe bend tests, were greatly improved when the volatile flux was used. The surfaces to be metal-coated were first provided with a thin film of graphite—or with a suitable lubricant, such as "Aquadag," i. e., a commercially available colloidal dispersion of graphite in an aqueous solution. When using "Aquadag," the treated surfaces are dried prior to spraying the metallic particles thereon. The metal reproductions thus made were readily removable, mold damage was minimized, and complicated objects were reproducible with ease.

Spraying processes upon which the present invention is an improvement are disclosed, for example, in United States Patents Nos. 1,617,166 and 1,179,762, issued to M. U. Schoop; and in United States Patent No. 1,178,551, issued to Stolle et al.

This application is a continuation-in-part of my pending application, Serial No. 87,666, filed June 27, 1936, for improvement in "Metallizing operation."

I claim:

1. A spray metallizing process which comprises spraying molten metal particles onto an article to be coated therewith by means of a jet of a gas impregnated with a volatile flux comprising at least one ester selected from the group consisting of the alkyl esters of boric acids and the alkyl esters of silicic acids.

2. A spray metallizing process which comprises spraying molten metal particles onto an article to be coated therewith by means of a dry gas impregnated with a volatile flux comprising at least one ester selected from the group consisting of the alkyl esters of boric acids and the alkyl esters of silicic acids.

3. A spray metallizing process which comprises spraying molten metal particles onto an article to be coated therewith by means of a jet of a gas impregnated with a volatile flux comprising methyl borate.

4. A spray metallizing process which comprises spraying molten metal particles onto an article to be coated therewith by means of a jet of a gas impregnated with a volatile flux comprising methyl silicate.

5. A spray metallizing process which comprises spraying molten metal particles onto an article to be coated therewith by means of a jet of a gas impregnated with a volatile flux comprising a mixture of vapors of a volatile organic solvent and at least one ester selected from the group consisting of the alkyl esters of boric acids and the alkyl esters of silicic acids.

6. A spray metallizing process which comprises spraying molten metal particles onto an article to be coated therewith by means of a jet of a gas impregnated with a volatile flux comprising an alkyl borate and a volatile organic solvent forming an azeotropic mixture with the said borate, said borate and solvent being present in approximately the ratio in which they exist in their azeotropic mixture.

7. In a metallizing operation wherein a metal coating is deposited on an article by spraying molten metal particles onto the article at a spraying zone by means of a jet of gas, the method of improving the bond between the metal particles and of inhibiting surface discoloration of the deposited metal, which comprises impregnating a selected portion of the said gas flowing to the spraying zone continuously and uniformly with a volatile flux comprising at least one ester selected from the group consisting of the alkyl esters of boric acids and the alkyl esters of silicic acids, and spraying molten metal particles onto said article by means of a jet of gas essentially comprising the resultant flux-impregnated gas mixture.

8. A spray metallizing process which comprises impregnating an inert gas with a volatile flux selected from the group consisting of the alkyl esters of boric acids and the alkyl esters of silicic acids, and spraying molten metal particles onto an article to be coated therewith by means of a jet of the thus-impregnated gas.

9. A spray metallizing process which comprises continuously impregnating a flowing stream of a gas with a uniform regulated amount of a volatile flux comprising an ester selected from the group consisting of the alkyl esters of boric acids and the alkyl esters of silicic acids, and spraying molten metal particles onto an article to be coated therewith by means of a jet of the thus-impregnated gas.

10. A spray metallizing process which comprises impregnating a flowing stream of a gas with a uniform regulated amount of methyl borate, and spraying molten metal particles onto an article to be coated therewith by means of a jet of the thus-impregnated gas.

11. A spray metallizing process which comprises spraying molten metal particles onto an article to be coated therewith by means of a jet of a gas containing a uniform regulated amount of a volatile alkyl borate and methyl alcohol, the said borate being present in admixture with said alcohol in an amount at least as great as that present in the azeotropic mixture of said borate and said alcohol.

12. A spray metallizing process which comprises spraying molten metal particles onto an article to be coated therewith by means of a jet of a gas containing a uniform regulated amount of a volatile alkyl borate and ethyl alcohol, the said borate being present in admixture with said alcohol in an amount at least as great as that present in the azeotropic mixture of said borate and said alcohol.

THOMAS H. VAUGHN.